J. C. FERGER.
BAKER'S OVEN.
APPLICATION FILED JUNE 7, 1909.
954,385.
Patented Apr. 5, 1910.
3 SHEETS—SHEET 1.
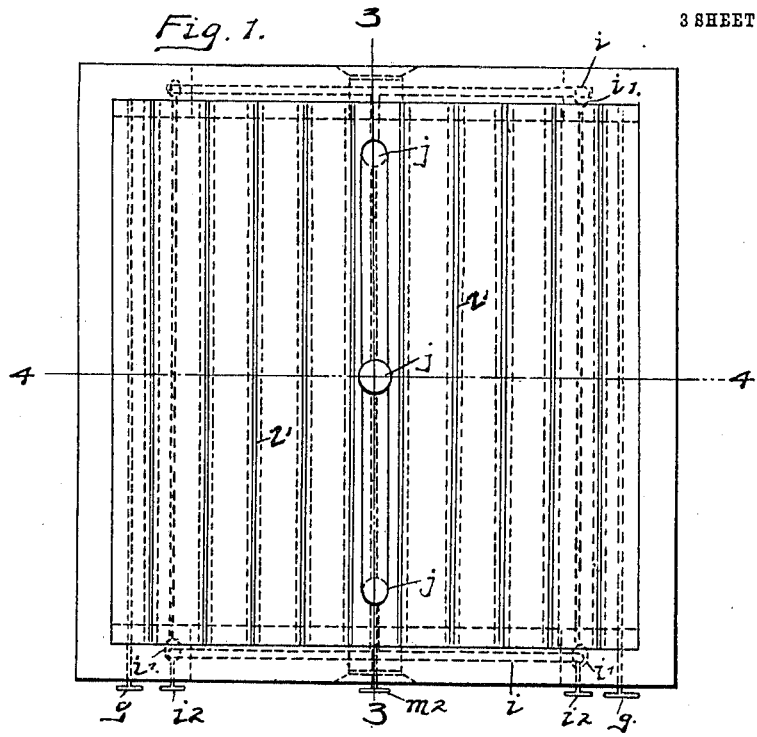
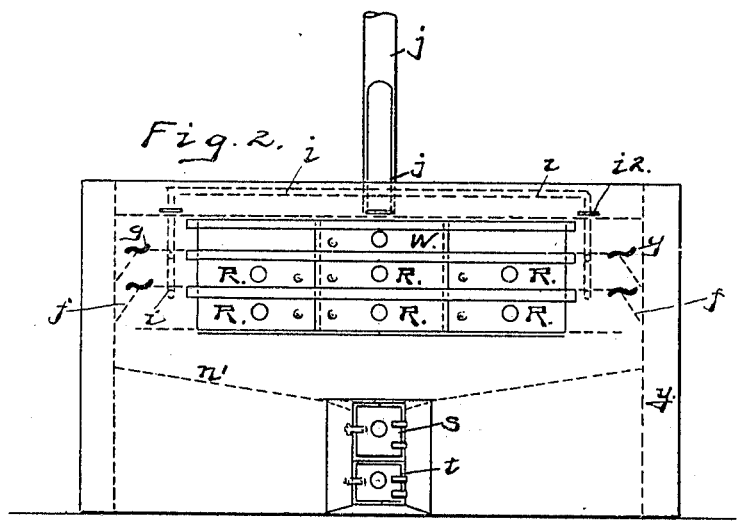
WITNESSES:
INVENTOR
John Charles Ferger,
By Minturn Moerner,
Attorneys.

J. C. FERGER.
BAKER'S OVEN.
APPLICATION FILED JUNE 7, 1909.

954,385.

Patented Apr. 5, 1910.
3 SHEETS—SHEET 2.

WITNESSES:
Mitchell C. Devaney.
P. Kruse.

INVENTOR
John Charles Ferger,
By
Minturn Moermer
Attorneys.

J. C. FERGER.
BAKER'S OVEN.
APPLICATION FILED JUNE 7, 1909.
954,385.
Patented Apr. 5, 1910.
3 SHEETS—SHEET 3.
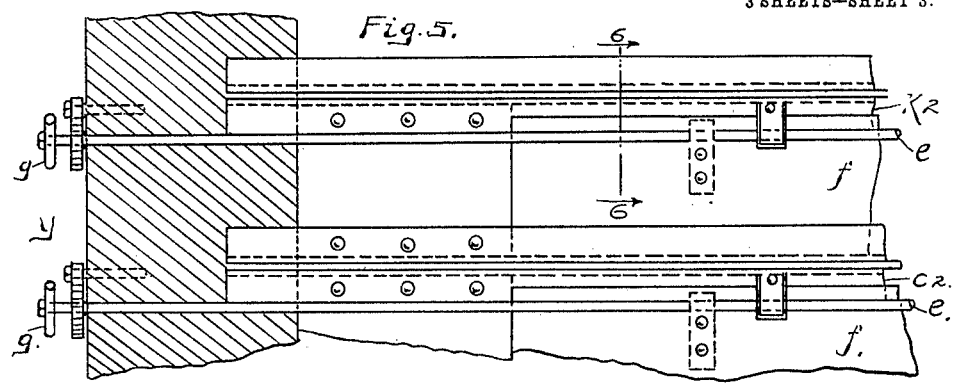
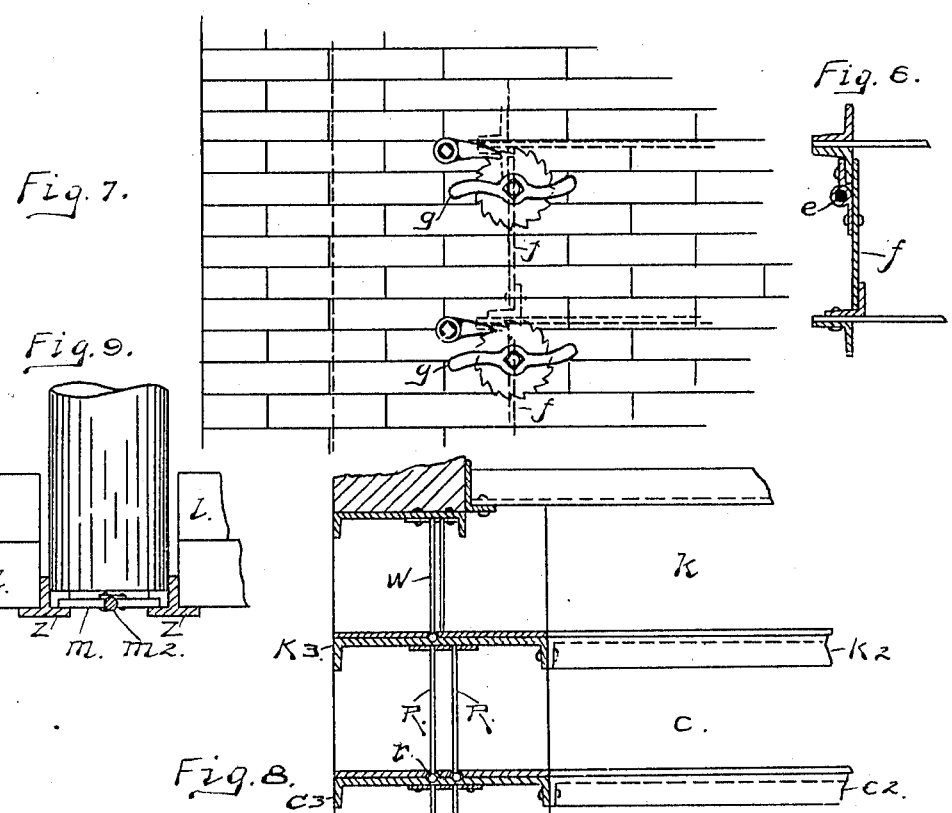
WITNESSES:
INVENTOR.
John Charles Ferger.
By
Minturn Werner,
ATTORNEYS.

UNITED STATES PATENT OFFICE.

JOHN CHAS. FERGER, OF INDIANAPOLIS, INDIANA, ASSIGNOR OF ONE-HALF TO HERMAN FERGER, OF CHATTANOOGA, TENNESSEE.

BAKER'S OVEN.

954,385.  Specification of Letters Patent.  Patented Apr. 5, 1910.

Application filed June 7, 1909. Serial No. 500,795.

*To all whom it may concern:*

Be it known that I, JOHN CHARLES FERGER, a citizen of the United States, residing at Indianapolis, in the county of Marion and State of Indiana, have invented a new and useful Baker's Oven, of which the following is a specification.

My invention relates to improvements in bakers' ovens, and the objects of my invention are, first, to provide an oven in which a constant fire may be used for heating it whereby a continuous baking operation may be secured without interruptions for reheating as is required in many forms of ovens and particularly in ovens of the type having a brick or tile baking surface known as hearth ovens; second, to provide an oven in which the furnace will be located approximately under the middle of the hearth in order to secure a uniform heat for all parts of the oven, and to provide an oven which will be cheap to construct, durable, and capable of easy and varied regulation, whereby any desired heat may be secured to suit the nature of the baking to be done, and a further object is to provide an oven with the above capabilities in which wood, coal, coke, gas or any of the well known fuels may be used.

I accomplish the objects of the invention by the mechanism illustrated in the accompanying drawings, in which—

Figure 3:
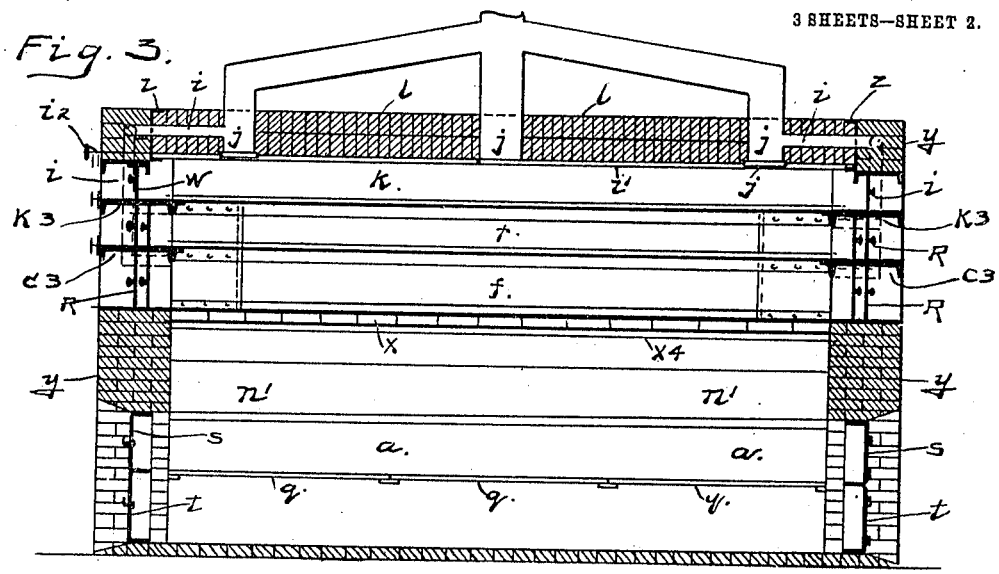
Figure 4:
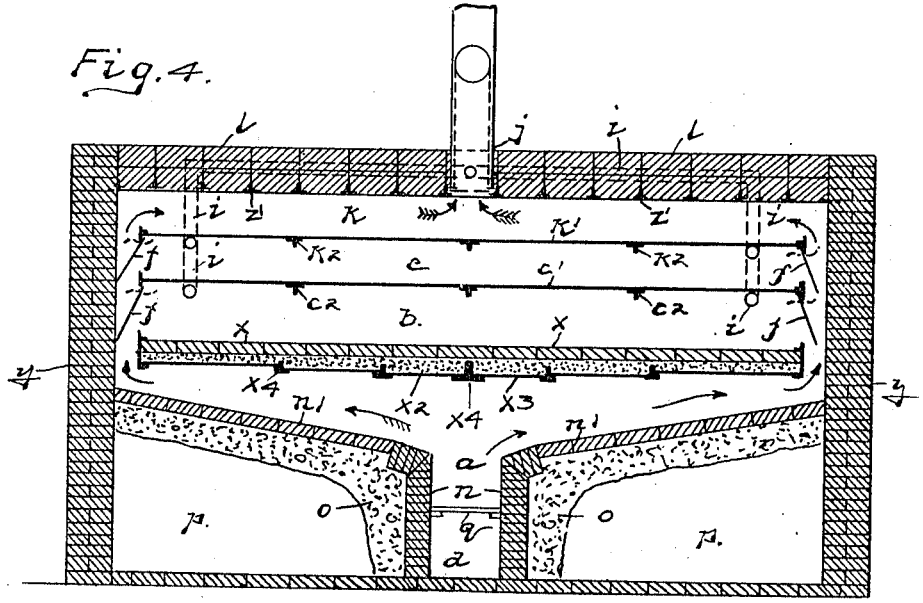

Figure 1 is a top plan view of one form of my invention. Fig. 2 is a front end view of same. Fig. 3 is a vertical section on the line 3—3 of Fig. 1. Fig. 4 is a vertical section on the line 4—4 of Fig. 1. Fig. 5 is a detail in vertical section on the same plane as Fig. 3 but on a larger scale. Fig. 6 is a detail in vertical section on the line 6—6 of Fig. 5. Fig. 7 is a detail in outside view of the front end of the oven shown in Fig. 2, on a larger scale to illustrate the mechanism for holding the adjustment of the heat regulating plates. Fig. 8 is a detail on the same plane as Fig. 3 but on a larger scale illustrating the manner of supporting the horizontal divisions of the oven, and Fig. 9 is a detail showing the manner of supporting the flues for the discharge of the waste products of combustion and arranging dampers therefor.

Like characters of reference indicate like parts throughout the several views.

The outside walls $y$ of my oven will preferably be formed out of brick or concrete in the usual manner, and supported by the front and rear walls of the oven are the channel-beams Z which provide the supports for angle-irons $z'$. The arch or top of the oven $l$ is built with bricks which are supported by said angle-irons $z'$.

$a$ represents the fire-box of the furnace. It is confined between the vertical walls $n$, preferably of fire-brick, which also supports the grate-bars $q$. Below the grate-bars is the ash-pit $d$. The fire-box $a$ is comparatively narrow so as to confine the fuel for the best results without waste, and the walls $n$ diverge above the fire-box as shown at $n'$, which walls $n'$ extend into contact with the side walls $y$ of the furnace. A suitable backing of concrete $o$ is placed outside of the wall $n$ and under the extension $n'$ of said wall, and under the concrete is a filling of earth or other suitable material $p$. The usual doors $s$ and $t$ are provided to the fire-box and ash-pit respectively.

It will be noted that I have illustrated a double oven, that is, an oven having doors at each of its ends. This is desirable where the capacity of the large or double oven is needed and where the available working space will permit of the necessary operations at both ends of the oven. Where the requirements of the business and space conditions will not warrant the use of a double oven its longitudinal dimensions will be shortened and the rear end will not be provided with doors.

The space between the fire walls $n'$ and the roof $l$ of the oven will preferably be divided into a series of horizontal ovens one above the other. I have here shown this space as divided into two ovens $b$ and $c$. The floor or hearth of the lower oven $b$ is covered with hearth or soft brick $x$ thereby rendering it adaptable for hearth-bread, but it may also be used for general baking purposes. The brick $x$ are supported on a suitable layer $x^2$ of a material which is a poor conductor of heat and this is retained by metal plates $x^3$ which are supported on angle-irons $x^4$ having their bearings in the end walls $y$ of the oven. It will be noted that the combined thickness of this floor of the oven $b$ will increase from each side-edge toward the middle. By this construction the greatest thickness will be over the fire-box of the furnace where there is the most intense heat and the thickness of the floor will be gradually lessened on each side of this middle. The decrease in thickness will be made on the under side of the floor which under side will form the roof of the firebox and by its shape will divide the heat causing it to pass equally to the two vertical passages which will be hereinafter described. This will further assist in distributing the heat equally to all parts of the oven.

The upper oven $c$ is separated from the oven $b$, and also from a smoke space $k$ next to the roof of the oven, by horizontal metal plates $c^1$ and $k^1$, and the horizontal plates $c^1$ and $k^1$ are supported upon the angle-irons $c^2$ and $k^2$ which are in turn supported by channel plates $C^3$ and $K^3$ in the end walls of the oven.

Referring to Fig. 4 it will be seen that heat passages are provided between the side walls $y$ and the ovens $b$ and $c$. The heat and waste products of combustion from the fire-box $a$ pass equally through both of these passages into the chamber $k$ at the top of the oven above the upper oven $c$. Openings are provided from these passages into ovens $b$ and $c$ which are closed by heat regulating plates $f$. The construction of said plates $f$ is best illustrated in Figs. 5, 6 and 7, where it will be noted that the plates $f$ are fastened on round iron rods $e$ having their bearings in the end walls of the oven and extending at at least one of their ends to the outside of the oven wall where they are provided with a lip or handle $g$ for the manual operation of the heat regulating plates. The rods will preferably be provided with some means for holding a given adjustment of the heat regulating plates, here shown as a pawl and ratchet wheel, the ratchet wheel being mounted on the rod and the pawl pivotally supported by the oven wall and adapted to engage the teeth of the wheel.

The top oven $c$ can be used for any kind of baking which is placed upon pans, and the heat for this oven as well as the oven below can be nicely regulated by suitably opening or closing the heat regulating plates $f$.

Both ovens $b$ and $c$ are provided with openings near their four corners into a small passageway $i$ which discharges into the principal flue $j$ of the oven. The purpose of the passageway $i$ is to enable smoke, steam, gas, or heat, which has been unduly accumulated in the oven to escape, and in order to regulate the discharge through this passageway, I provide damper plates $i'$ which are connected with a handle-rod $i^2$ extending outside of the oven, by means of which the damper-plate may be moved to open or close the passageway $i$. The main flue $j$ will communicate with the chamber $k$ at the top of the arch and will be for the usual purpose of carrying off smoke and other waste products of combustion and undesirable vapors incident to the baking operation. I have shown three separate openings into the chamber $k$ for the purpose of better equalizing the work to be accomplished by the flue, but it is obvious that a single flue or a greater or less number of openings than I have shown may be used without departing from the spirit of my invention.

A sliding damper $m$ will be provided with a suitable rod extension $m^2$ for operating it, whereby the size of the openings to the flues $j$ may be readily controlled. It will be noted that the damper plates $m$ for all three of the flue openings are mounted upon the same rod $m^2$.

The ovens $b$ and $c$ are each provided with three sliding doors at all of their outside openings. Channels forming ball races are made in the door sills and the doors R will be mounted on friction balls $r$ operating in said races to facilitate the sliding movement of the doors. The doors for each opening will preferably be operated in two parallel grooves, one door in the front and two in the back groove. The top chamber $k$ will be provided with a single sliding door $w$ to allow access to the chamber for cleaning out or for the introduction therein of anything to be heated.

While I have shown and described the preferred embodiment of my invention it will be understood that I do not wish to be limited to the precise construction herein set forth, since various changes in the form, proportion, and minor details of construction may be resorted to without departing from the principle or sacrificing any of the advantages of this invention.

Having thus fully described my said invention what I claim as new and wish to secure by Letters Patent of the United States, is—

1. In a baker's oven, supporting walls, a fire-box midway between and parallel with two of said walls, a floor supported above the fire-box having a brick surface, metal floors above the latter floor defining an additional oven and smoke chamber, each extending from the front to the rear walls of the oven, vertical heat passages at the sides of the oven also extending from the front to the rear walls of said oven to conduct the heat from the fire-box to the smoke chamber, and adjustable plates extending from front to rear walls of the oven to regulate the discharge of heat from said passages directly into said ovens.

2. In a baker's oven, supporting walls, a fire-box between said walls, a floor supported by said walls thickest over the fire-box and reduced in thickness toward its two adjacent parallel edges, vertical heat passages at said two edges coextensive therewith, oblique passages from the fire-box communicating with said vertical heat passages, interior walls defining an inside oven and having openings into said vertical heat passages, said openings being coextensive with said heat passages, and adjustable closures for said openings coextensive with said openings.

3. In a baker's oven, supporting walls, a fire-box midway of the side members of said walls, a floor or hearth supported by said walls having a brick face or top, said floor being thickest at its middle over said fire-box, and reduced by stages toward said side walls, vertical heat passages between said floor and side walls extending the entire depth of the oven, upwardly oblique passages from the fire-box communicating with said vertical passages, interior walls defining an inside oven said walls having openings into said vertical heat passages coextensive with the depth of the oven, and adjustable heat regulating plates for said openings coextensive with said openings.

4. In a baker's oven, supporting walls, a fire-box midway of the side members of said walls, a floor or hearth supported by said walls having a brick face or top said floor being thickest at its middle above the fire-box and reduced by stages toward said side walls, two horizontal divisions above said brick faced floor defining a lower and an upper oven and a chamber for waste products of combustion above the upper chamber, vertical heat passages between said two ovens and said side walls extending all the way from front to rear thereof, upwardly oblique passages from the fire-box communicating with said vertical passages, and adjustable heat regulating plates extending the full depth of said ovens to regulate the direct passage of heat into said lower and upper ovens.

5. In a baker's oven, supporting walls, a fire-box midway of two of said supporting walls, a floor supported above said fire-box by said walls and having vertical heat passages at its two side edges coextensive therewith, two horizontal divisions above said floor defining an upper and lower oven and a chamber for waste products of combustion above the upper oven, and adjustable plates coextensive with the depth of the ovens for regulating the passage of heat from said vertical heat passages into said upper or lower oven.

6. A baker's oven having heat passages extending from front to rear thereof and openings into said passages coextensive with said passages, adjustable plates coextensive with the depths of the ovens at said openings to regulate the passage of heat into the oven, a smoke pipe at the top of the oven into which said heat passages ultimately discharge, and auxiliary passages communicating with the interior of the oven and discharging into said smoke pipe.

7. A baker's oven having heat passages extending from front to rear thereof and openings into said passages coextensive with said passages, adjustable plates coextensive with the depths of the ovens at said openings to regulate the passage of heat into the oven, a smoke pipe at the top of the oven into which said heat passages ultimately discharge, a plurality of auxiliary passages communicating with as many different parts of the oven as there are auxiliary passages, all of said auxiliary passages discharging ultimately into said smoke pipe, and dampers for regulating the discharge through said auxiliary passages and through said smoke pipe.

8. In a baker's oven, supporting walls, a fire-box midway of two of said supporting walls, a brick faced floor supported above said fire-box the under side of said floor being increased in thickness from its side edges to its middle over the fire-box, horizontal divisions above said floor defining additional ovens, angle bars supported by the said walls and forming the support for said floor and horizontal divisions, vertical heat passages adjacent the two side walls extending from the front wall to the rear wall of the oven, upwardly oblique passages from the fire-box communicating with said vertical passages, and adjustable heat regulating plates coextensive with the full depth of the ovens to regulate the direct passage of heat into the ovens.

9. In a baker's oven, rectangular supporting walls, a fire-box midway of two parallel side walls, a floor or hearth supported by said walls having a brick face, said floor increasing in thickness from its side edges to a midline above the fire-box on the under side of said floor, two horizontal divisions above said floor defining a lower and an upper oven and a chamber for waste products of combustion above the upper oven, doors in triplicate slidingly mounted on ball bearings at the mouth of each of said ovens, vertical heat passages between said two ovens and adjacent side walls, upwardly oblique passages from the fire-box communicating with said vertical passages and adjustable plates to regulate the direct passage of heat into said upper and lower ovens.

10. In a baker's oven, rectangular supporting walls, a fire-box midway of two parallel members of said walls, said fire-box having vertical sides which continue above the fire-box in opposite upward oblique directions and connect with the side supporting walls of the oven, a floor or hearth having a brick top, the under side of said floor increasing in thickness from its side edges to a midline parallel with and above the fire-box, two horizontal divisions above the brick faced floor defining a lower and an upper oven, and a chamber for waste products of combustion above the upper oven, angle bars supporting the floor and two horizontal divisions, vertical heat passages between said ovens and side walls forming communications between the fire-box and top chamber, adjustable heat regulating plates to regulate the direct passage of heat into said oven compartments, and smoke pipes leading from the upper chamber of the oven.

J. CHAS. FERGER.

Witnesses:
  MITCHELL O. DEVANEY,
  J. FRED. FERGER.